United States Patent [19]
Rigny et al.

[11] Patent Number: 6,094,513
[45] Date of Patent: Jul. 25, 2000

[54] DEMULTIPLEXER WITH A SQUARE SPECTRAL RESPONSE

[75] Inventors: Arnaud Rigny, Guignen; Adrien Bruno, Acigné, both of France

[73] Assignee: France Telecom, France

[21] Appl. No.: 09/191,204

[22] Filed: Nov. 12, 1998

[30] Foreign Application Priority Data

Nov. 13, 1997 [FR] France .................................. 97 14230

[51] Int. Cl.$^7$ ...................................................... G02B 6/28
[52] U.S. Cl. ................................. 385/24; 385/46; 385/39
[58] Field of Search ................................ 385/45–49, 24, 385/37, 38, 39–44

[56] References Cited

U.S. PATENT DOCUMENTS 5,978,532  11/1999  Rigny et al. ............................... 385/46

FOREIGN PATENT DOCUMENTS 0736785  10/1996  European Pat. Off. .

OTHER PUBLICATIONS

Okamoto K. et al.: "Arrayed Waveguide Grating Multiplexer With Flat Spectral Response" Jan. 1, 1995, Optics Letters, vol. 20, No. 1 pp. 43–45.

Okamoto K. et al.: "Flat Spectral Response Arrayed–Waveguide Grating Multiplexer With Parabolic Waveguide Horns" Electronics Letters, vol. 32, No. 10, Aug. 29, 1996.

M.R. Amersfoort et al.: "Passeband Broadening of integrated arrayed waveguides filters using multimode interference coupler" Electronics Letters, vol. 32, No. 5 Feb. 29, 1996 pp. 449–451.

"Recent Improvements in Arrayed Waveguide Grating Dense Wavelength Division Multi/Demultiplexers" H. Uetsuka et al. Hitachi Cable Limited.

"Chirping of a MM—Phasar Multiplexer For Application in Multiwavelength Lasers" Delft University of Technology.

"Passband Flattening Of Phasar WDM Using Input And Output Star Couplers Designed With Two Focal Points" D. Trouchet Thursday Afternoon pp. 302–303.

"Taper–Assisted Polarisation Compensation In Efficiently Fibre–Coupled Inp Demultiplexer" by A. Rigny, et al.: Electronics Letters Sep. 26, 1996 vol. 32, No. 20.

"An NxN Optical Multiplexer Using a Planar Arrangement of Two Star Couplers", IEEE Photonics Technology Letters, vol. 3, No.9 Sep. 1991 pp. 812–815.

*Primary Examiner*—Phan T.H. Palmer
*Attorney, Agent, or Firm*—Blakely Sokoloff Taylor & Zafman

[57] ABSTRACT

The present invention relates to a multiplexer and/or demultiplexer optical component of the waveguide array spectrograph type, wherein the waveguides are numbered in order of increasing optical path length, the optical path lengths of the waveguides describing a function of waveguide number which varies about a mean linear function, a difference measured between said waveguide number function and said mean linear function describing a difference function not limited to a set of two linear functions, said difference function being suitable for giving the optical component a spectral response that is square in shape.

10 Claims, 6 Drawing Sheets

DEMULTIPLEXER WITH A SQUARE SPECTRAL RESPONSE

The present invention relates to a multiplexer and/or demultiplexer component of the spectrographic or "grating" type having an array of waveguides (also known as a "phasar" in the art).

BACKGROUND OF THE INVENTION

A spectrographic multiplexer having an array of waveguides conventionally comprises a dispersive array of optical waveguides connected to inlet waveguides and to outlet waveguides via two star couplers. The field in an inlet waveguide is reproduced in the plane of the outlet waveguides when the optical path length difference between two adjacent waveguides of the array is equal to an integer number of times the inlet wavelength. In other words, the maximum intensity position depends on the equiphase plane at the outlet of the array of waveguides and thus depends on wavelength. Such a configuration thus makes it possible to separate various wavelengths in space. A variation in wavelength gives rise to a shift in field distribution on the outlet waveguides.

By way of example, such components are used as a 1 to N demultiplexer, as an N to 1 multiplexer, or as an N to N multiplexer with switching.

A particularly advantageous application lies in the field of optical fiber telecommunications, for example in a direct detection receiver circuit in a transmission system. In an optical distribution network, such a component can be used for a plurality of users to separate signals of different wavelengths arriving on a common optical fiber, with each user receiving a respective wavelength. Such a component is also advantageously used in an optical device for interconnection, e.g. between fast electronic "chips" having a high degree of integration, or between computers, or even within a computer.

Usually, the spectral response obtained in an outlet waveguide of such a component corresponds to coupling a Gaussian beam in a Gaussian waveguide and is therefore itself Gaussian.

Nevertheless, a Gaussian spectral response requires wavelengths to be controlled accurately on emission, which makes such a response difficult to use in a system. The existence of small fluctuations in the wavelength at which a laser emits (fluctuations due to temperature) thus make it necessary for such lasers to be servo-controlled, which is difficult and expensive, or to use channels having spectral responses that are wider.

Enlarging spectral response also makes it easier to achieve independence from polarization. The techniques that have been proposed for obtaining independence from polarization and that rely on controlling waveguide geometry continue to deliver poor performance.

By using a flat or square spectral response, the power received on a channel is independent of polarization, even if the two TE and TM peaks are slightly offset (offset associated, for example, with poor control over geometry).

Several techniques have already been proposed for making a spectrograph having an array of waveguides and presenting a spectral response of the square type.

Proposals have thus been made to modify the mode shape of the inlet (or outlet) waveguides. In a phasar, light in the inlet waveguide propagates through the first coupler and spreads laterally. The waveguides of the array intercept the light which then propagates in each of the waveguides, and interferes in the second coupler. The field at the inlet of the outlet waveguides, as created by this interference, reproduces the field at the outlet of the inlet waveguide. Thus, the spectral response in terms of transmission between the inlet and the outlet as a function of wavelength corresponds to the convolution of the inlet mode and the outlet mode.

Thus, if the inlet mode can be considered as being the superposition of two peaks, convolution with a Gaussian outlet mode gives a flattened spectral response.

Thus, "Recent improvements in arrayed waveguide grating dense wavelength division multi/demultiplexers", Hitachi Cable Limited, by H. Uetsuka et al., E.C.I.O. 97, proposes a first solution consisting in using a Y junction at the inlet to the first coupler. Light is shared equally between the two branches of the junction. The inlet mode can thus be considered as being made up of two peaks. The convolution of these two peaks with the outlet waveguide mode is therefore a flattened function.

In "Chirping of a MMI-PHASAR multiplexer for application in multi-wavelength lasers", University of Delph: C.G.P. Herben et al., E.C.I.O. 97, a second solution is proposed consisting in using a multimode interference (MMI) coupler for obtaining a "bi-modal" field having two peaks at the inlet of the first coupler. The spectral response is flattened for the same reason.

Both of those two solutions require an additional object such as a Y junction or an MMI to be included, which goes against reducing volumes within systems. Such devices are also tricky to optimize. In addition, those solutions do not enable highly flattened or "square" spectral responses to be obtained.

To quantify the fact that a spectral response is flattened to a greater or lesser extent, a parameter n is defined as the ratio of spectral width at 1 dB over spectral width at 20 dB.

The coefficient η increases with increasing squareness or flatness of the spectral response. By way of example, this coefficient is 23% for a Gaussian response.

Inlet mode modification by those two techniques, using a Y junction or an MMI, makes it possible to obtain a composite mode having a plurality of Gaussian peaks. The resulting mode thus contains Gaussian "flanks", and so does the resulting spectral response. The coefficient η is therefore limited by the intrinsically Gaussian nature of the modes. With a Y junction, a parameter η is obtained that is equal to 32%, and in the MMI solution, the parameter η is 44%. It is not possible to obtain a coefficient η of close to 90% using those methods.

In "Passband flattening of PHASAR WDM using input and output star couplers designed with two focal points", Corning: D. Trouchet, A. Béguin, H. Boerk, C. Prel, C. Lerminiaux, R. O. Maschmayer, OFC 1997 Technical Digest, p. 302, a technique is proposed that consists in using two focal points in the outlet coupler, enabling the energy to be separated into two Gaussian peaks. The superposition of those peaks convoluted with the outlet mode makes it possible to obtain a spectral response that is flattened.

In French patent application FR-96 11601, a phasar is proposed having two arrays of waveguides of different pitch.

Patent application FR-96 11601 also proposes a phasar in which an inlet waveguide of the inlet coupler or an outlet waveguide of the outlet coupler has a range such that the waveguide, while remaining monomode, presents a two-peak shape.

In all three of the above techniques, the flanks of the spectral response that is obtained are Gaussian. It is therefore not possible to obtain spectral responses that are very square.

In "Arrayed-waveguide grating multiplexer with a flat spectral response", NTT, K. Okamoto and H. Yamada, Optics Letters, January 1995, Vol. 20, No. 1, proposals are made to obtain power distribution in the array that is of the "sinc" or "(sin x)/x" type, by modifying the power distribution at the inlet of the array of waveguides. Since the spectral response is the Fourier transform of this distribution, it is square.

The distribution of power in the array is due to expanding the mode of the inlet waveguide coupled to the waveguides of the array. This expansion is generally modelled by a Fourier transform. Since the waveguides generally used are integrated monomode waveguides having, to a good approximation, a Gaussian mode laterally (so the field after expansion is also Gaussian), it is difficult to obtain "sinc" type power distribution in the array with such waveguides.

To obtain secondary lobes in the array, it is therefore necessary to modify the mode of the inlet waveguide, which must have a "square" shape. It is therefore necessary to modify the shape of this mode, but without using multimode waveguides.

Furthermore, the secondary lobes of the sinc function must have values that are alternately positive and negative. Since power is always positive, it is necessary to introduce a π phase shift in the array at the guides corresponding to secondary lobes of this power distribution.

This phase shifting corresponding to the secondary lobes must be controlled accurately, since a position error for a waveguide relating to the additional phase shifting degrades the spectral response very severely and makes the phasar unusable. It is also necessary to control accurately the positions of the secondary lobes in the array.

It will be understood that this technique which acts on the shape of the inlet power and on the phase shifting in the array of waveguides is difficult to implement, and that poor control of manufacturing parameters gives rise very quickly to degraded component performance.

OBJECTS AND SUMMARY OF THE INVENTION

The main aim of the invention is to propose a multiplexer and/or demultiplexer of the type comprising a spectrograph made up of an array of waveguides which presents a square spectral response and which does not suffer from the drawbacks of the above-mentioned techniques.

The invention also proposes a spectrograph having an array of monomode waveguides that can be implemented in a single epitaxial step. A phasar of the invention is thus simple to make.

A phasar of the invention makes it possible to ignore emission fluctuations in lasers, is compatible with being integrated with other components, and is of a geometry that is not modified by inserting an additional element.

The invention thus proposes a multiplexer and/or demultiplexer optical component of the waveguide array spectrograph type having an inlet coupler and an outlet coupler between which said array extends, and including inlet and outlet optical waveguides respectively for said inlet and outlet couplers, wherein the waveguides are numbered in order of increasing optical path length, the optical path lengths of the waveguides describing a function of waveguide number which varies about a mean linear function, a difference measured between said waveguide number function and said mean linear function describing a difference function not limited to a set of two linear functions, said difference function being suitable for giving the optical component a spectral response that is square in shape.

BRIEF DESCRIPTION OF THE DRAWINGS

Other characteristics, objects, and advantages of the present invention appear on reading the following description and from the accompanying drawings given as non-limiting examples, and in which.

MORE DETAILED DESCRIPTION

Figure 1:
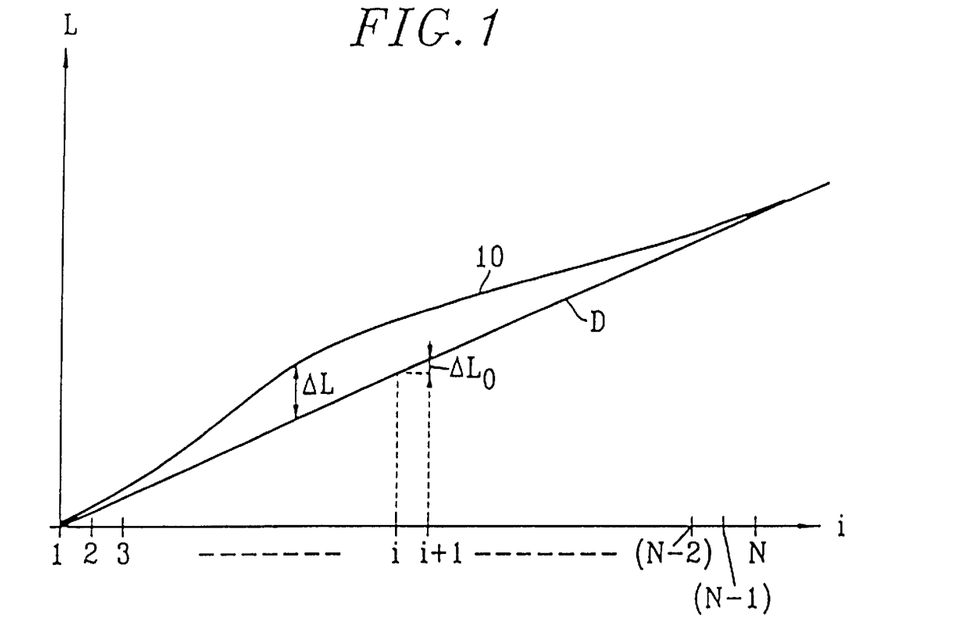
FIG. 1 is a graph showing a distribution of optical path lengths for waveguides in an array of the invention.

Along the abscissa of the graph of FIG. 1, there are plotted in increasing order the numbers given to the waveguides of a spectrograph having an array of waveguides. In conventional manner, for an array of N waveguides, the waveguides are numbered 1 to N depending on their rank i in order of increasing optical path lengths of the waveguides.

The ordinate of the graph in FIG. 1 corresponds to the optical path lengths L of the waveguides in the array.

The graph shows a straight line D of positive slope corresponding to an arrayed-waveguide spectrograph or phasar of known type.

This straight line D corresponds to the lengths of the waveguides being distributed with a fixed length increment $\Delta L_0$ between any two adjacent waveguides in the array.

As shown in FIG. 1, this constant wavelength difference $\Delta L_0$ is equal to the slope of the line D.

Within an outlet coupler, such a phasar produces a field which is an exact reproduction of the inlet mode. Thus, when the inlet waveguide(s) is/are of Gaussian type mode, the field obtained by interference in the outlet coupler is also of Gaussian type.

The inventors have discovered that by slightly modifying the above fixed increment distribution of waveguide lengths, while conserving the same power distribution in the array, it is possible to obtain a phasar having a square spectral response with flanks that are steeper than Gaussian flanks.

In the graph of FIG. 1, there is plotted a curve 10 corresponding to a distribution of optical path lengths in a phasar of the invention.

As can be seen in FIG. 1, in the vicinity of the smallest waveguide numbers and also in the vicinity of the largest waveguide numbers, it can be seen that the curve 10 practically coincides with the straight line D.

All of the curve 10 lies above the line D, i.e. for any waveguide number i in the range 1 to N, the length of waveguide i in the array of the invention and corresponding to curve 10, is longer than the length of waveguide i in the conventional array corresponding to the line D.

More precisely, compared with the straight line D, the curve 10 has a positive difference ΔL which reaches a maximum in the vicinity of waveguide numbers close to N/2.

Figure 2:
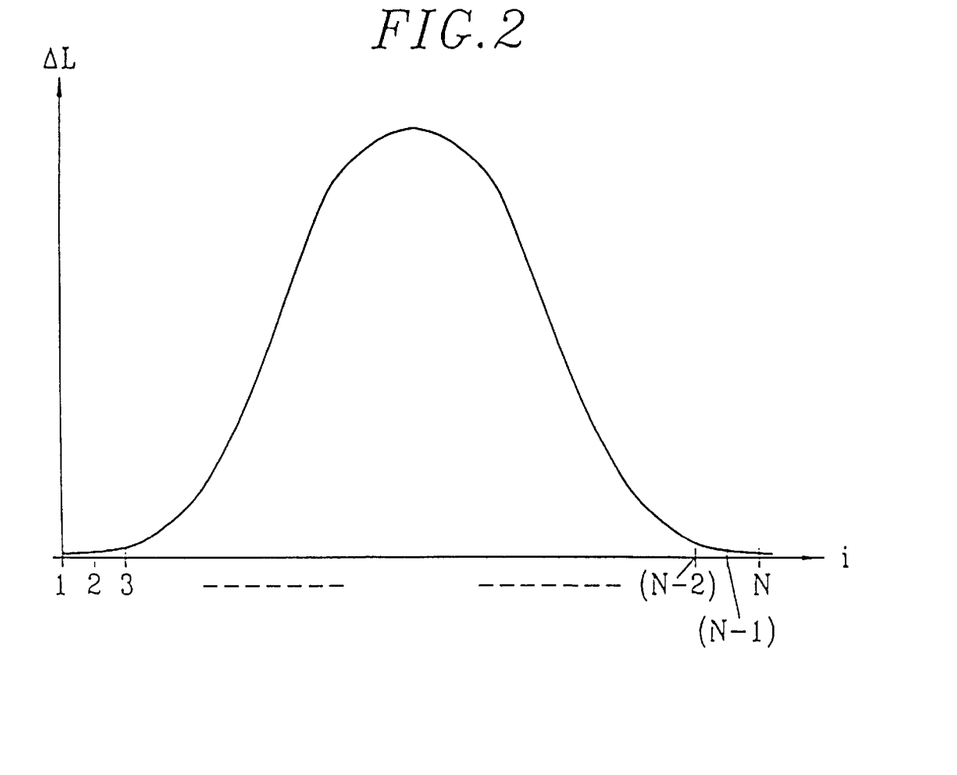
FIG. 2 is a graph showing a distribution of optical path length differences in accordance with the invention relative to a linear distribution.

FIG. 2 gives a curve representing this difference ΔL as a function of waveguide number in the array.

This curve starts from a difference of value zero in the form of a horizontal tangent in the vicinity of the lowest waveguide numbers, rises to a maximum having a horizontal tangent in the vicinity of numbers close to N/2, and returns to a zero value with a horizontal tangent in the vicinity of the total number N of waveguides.

More precisely, the shape of the curve showing the differences ΔL for numbers 1 to N constitutes a portion of a sinewave taken between two consecutive minima of the sinewave.

As can be seen in FIG. 1, the values of the differences ΔL are small enough compared with the values reached by the straight line D for it to be possible to consider that the straight line D is an average about which the values taken by the curve 10 vary.

The inventors have discovered that a phasar having the lengths of its waveguides distributed in the manner defined by the curve 10 presents a spectral response that is much squarer in shape or that has a top that is much flatter than a phasar having the lengths of its waveguides distributed as represented by a straight line close to the curve 10, such as the straight line D.

Figure 3:
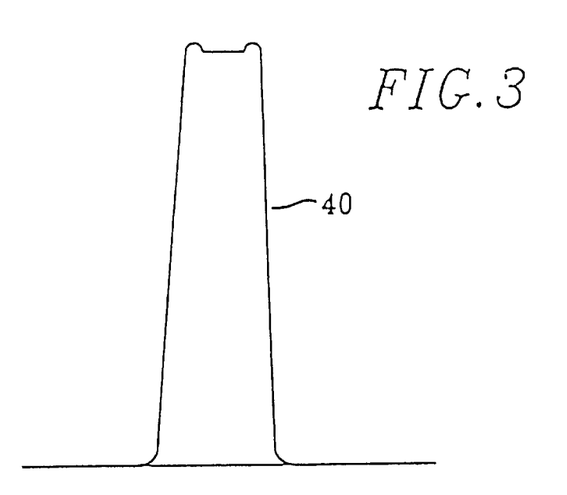
FIG. 3 shows a spectral response obtained using the difference distribution of FIG. 2.

Starting with a Gaussian inlet mode, an array of monomode waveguides, and a power distribution in the array that is imposed in conventional manner by the geometry of the inlet coupler, it is thus possible to obtain a square-shaped interference field in the outlet coupler, such as the field represented by a curve 40 in FIG. 3.

For a distribution of differences $\Delta L_i$ whose overall shape is close to the curve in FIG. 2, for example, this makes it possible to obtain a phasar having a spectral response that is square, as described above.

There follows a description of how, starting from a selected number N of waveguides and from a reference distribution of waveguide lengths presenting a fixed difference $\Delta L_0$ between two consecutive guides, it is possible to determine a distribution of lengths that varies about said linear distribution so as to enable a square spectral response to be obtained.

A phasar of the invention is designed starting from a conventional phasar presenting a fixed length increment $\Delta L_0$ between any two consecutive waveguides of the array, and for which the distribution of powers within the waveguides of the array is known, i.e. the power $P_i$ conveyed by any waveguide of number 1 is known, where i lies in the range 1 to N, and where N is the total number of waveguides in the array. In general, this distribution is Gaussian, but it could have any other shape.

The idea is to determine an additional length $\Delta L_i$ to be given to waveguide i compared with waveguide i of the initial, fixed-increment phasar.

This additional length $\Delta L_i$ is an algebraic length, i.e. the additional length $\Delta L_i$ might be negative. Compared with the signal leaving the same waveguide i in a reference phasar of fixed increment, the additional length $\Delta L_i$ gives rise to a phase shift $\epsilon_i$ at the outlet of each waveguide i. The phase shift $\epsilon_i$ is proportional to the additional optical path length $\Delta L_i$.

Thus, the spectral response h(u) of the phasar of the invention is given by:

$$h(u) = \sum_{n=1}^{N} P_n \cdot e^{j\epsilon_n} \cdot e^{j(n-1)u}$$

where u is the wavelength.

A method is proposed below for determining the differences $\Delta L_i$ so as to obtain a function h(u) that is square in shape.

Figure 4:
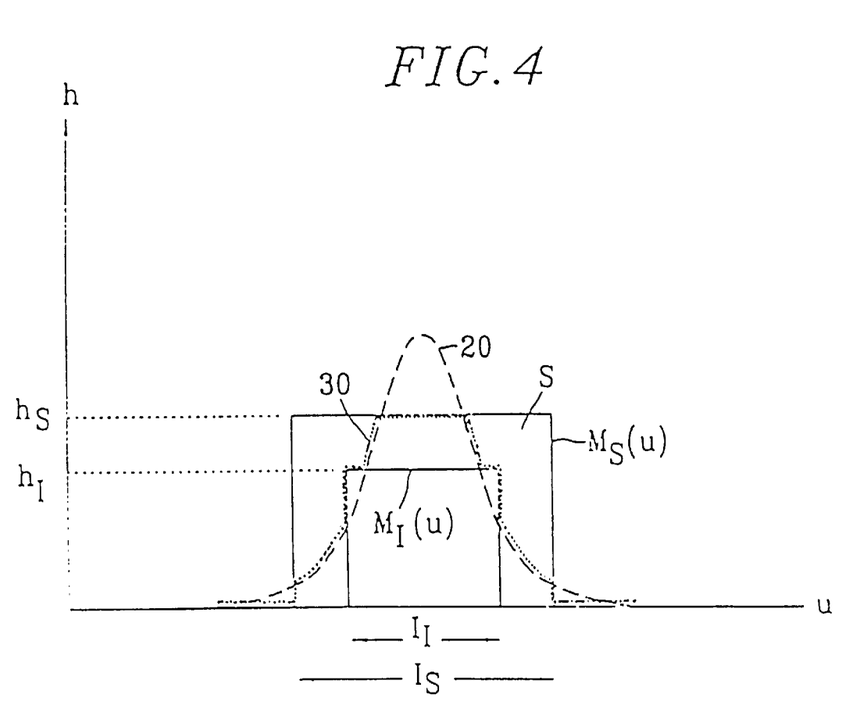
FIG. 4 is a single graph showing a permitted set of spectral responses, a Gaussian spectral response, and the projection of the Gaussian response onto the permitted responses.

For this purpose, as shown in FIG. 4, two square functions $M_S(u)$ and $M_I(u)$ are selected, defining in a plane (u, h) a zone S in which it is desired that the plot of the function h(u) shall lie.

Over an interval $I_S$, the function MS(u) has a constant value $h_S$ and is zero for values of U lying outside $I_S$. Overall an interval $I_I$, the function $M_I(u)$ has a constant value $h_I$.

The interval $I_I$ is included within the interval $I_S$, and the value $I_I$ is less than the value $h_S$, such that the plots for $M_I$ and $M_S$ define a swath of upside-down U-shape within the plane (u, h).

Dashed line 20 in FIG. 4 represents the spectral response $h_0(u)$ of a phasar having a fixed increment $\Delta L_0$ used as the basis for designing the phasar of the invention. In conventional manner, this spectral response is Gaussian.

Starting from $h_0(u)$, a first step consists in determining a function $F_2(u)$ that is defined as follows. For a given value u, if $h_0(u)$ lies between $M_I(u)$ and $M_S(u)$, then $F_2(u)$ is equal to $h_0(u)$; if $h_0(u)$ is greater than $M_S(u)$, then $h_0(u)$ is equal to $M_S(u)$; and if $h_0(u)$ is less than $M_I(u)$, then $h_0(u)$ is equal to $M_I(u)$.

The dotted line 30 plotted in FIG. 4 shows the resulting function $F_2(u)$. In mathematical terms, $F_2(u)$ is determined from $h_0(u)$ by projecting $h_0(u)$ on the set defined by $M_I(u)$ and $M_S(u)$. In the invention, any other type of projection onto such a set could be adopted.

A second step consists in calculating coefficients $a_n$ for n lying in the range $-\infty$ to $+\infty$, enabling the function $F_2(u)$ to be written in the form of a Fourier series:

$$F_2(u) = \sum_{n=-\infty}^{n=+\infty} a_n \cdot e^{j(n-1)u}$$

Given the powers $P_1, P_2, \ldots, P_N$ conveyed by the waveguides of the array, a third step consists in defining a function $F_1(u)$ on the basis of the coefficients an as follows:

$$F_1(u) = \sum_{n=1}^{N} P_n \frac{a_n}{|a_n|} e^{j(n-1)u}$$

The operation referred to as the "first step" above is repeated, but now starting from $F_1(u)$ rather than $h_0(u)$. A new function $F_2(u)$ is thus determined not on the basis of $h_0(u)$, but on the basis of the function $F_1(u)$ calculated in the preceding step.

$F_2$ is thus determined on the basis of $F_1$ as follows:
For given wavelength u, if $F_1(u)$ is less than $M_I(u)$, then $F_2(u)=M_I(u)$;

if $F_1(u)$ lies between $M_I(u)$ and $M_S(u)$, then $F_2(u)=F_1(u)$; and if $F_1(u)$ is greater than $M_S(u)$, then $F_2(u)=M_S(u)$.

Then the second and third steps as defined above are performed again so as to obtain a new function $F_1(u)$.

The succession of first, second, and third steps as defined above is reiterated several times until the plot of the function $F_1(u)$ obtained on the third step is almost entirely contained between the plots of the functions $M_I(u)$ and $M_S(u)$, i.e. until $F_1(u)$ is square in shape.

This final function $F_1(u)$ is expressed in the form:

$$F_1(u) = \sum_{n=1}^{N} P_n \frac{a_n}{|a_n|} e^{j(n-1)u}$$

or indeed:

$$F_1(u) = \sum_{n=1}^{N} P_n \cdot e^{j\varepsilon_n} \cdot e^{j(n-1)u}$$

where $\varepsilon_n$ is the phase of $a_n$.

The term $P_n e^{j(n-1)u}$ is referred to as the "complex power" in the array.

$F_1(u)$ is the spectral response of a phasar in which the length of each waveguide i is equal to the length of the waveguide i of the initial fixed increment phasar, plus an additional optical path length $\Delta L_i = \varepsilon_i$. As mentioned above, $\Delta L_i$ can be negative. $\Delta L_i$ is thus an optical path length difference relative to a mean linear distribution which is that of a known fixed increment phasar.

It then suffices to make such a phasar to obtain the square spectral response $F_1(u)$ in practice.

A distribution of lengths starting from the spectral response of an initial phasar of fixed increment has thus been determined. In a variant, it is possible to start the sequence of the various steps described above using an arbitrary function that is fairly close to the set S defined by $M_I(u)$ and $M_S(u)$.

Similarly, a projection set S is defined above using two rectangular functions $M_I(u)$ and $M_S(u)$. In a variant, it is possible to select two functions of shapes that are not strictly rectangular.

The inventors have found that by determining the additional wavelengths $\Delta L_i$ in this way, solutions $\Delta L_i$ for i lying in the range 1 to N are generally found that give rise to plots of the form shown in FIG. 2.

More precisely, the resulting series $\varepsilon_1, \ldots, \varepsilon_n$ are generally of the form:

$$\varepsilon_i = A\cos\left[(\pi + \phi) \frac{-(N+1)+2i}{(N-1)}\right]$$

where A and $\phi$ are constants.

More generally, the series $\varepsilon_1, \ldots, \varepsilon_N$ lie on a curve defined by a function of the type:

$$f(x) = A.\cos[(\pi+\phi)x]$$

where x lies between −1 and +1 while the waveguide number in the array lies in the range 1 to N.

Figure 5:
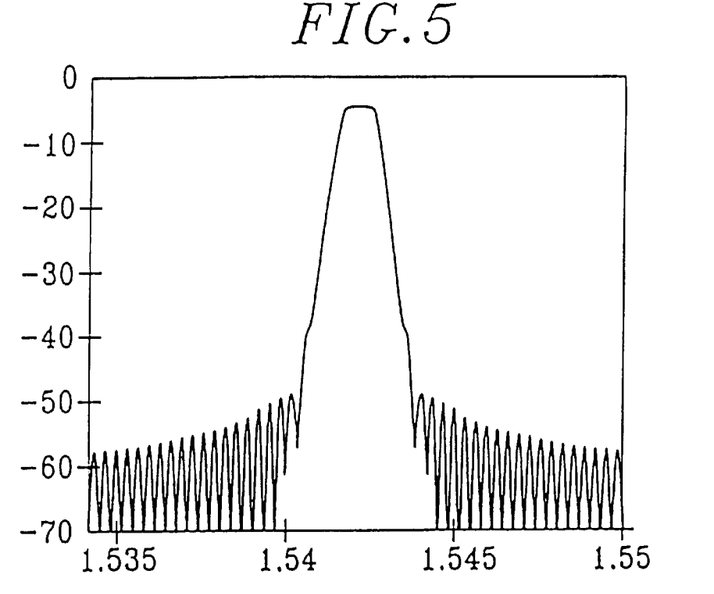
FIGS. 5 to 8 are plots showing the spectral responses of optical components of the invention.

Thus, for a phasar having 51 waveguides, the inventors have obtained the substantially square spectral response shown in FIG. 5 with A equal to 1.7 µm, and $\phi$ equal to 0.1 radians. This spectral response has a factor of merit η, defined as the ratio of spectrum width at 1 dB of a spectrum width at 20 dB which is equal to 33.3%.

Figure 6:
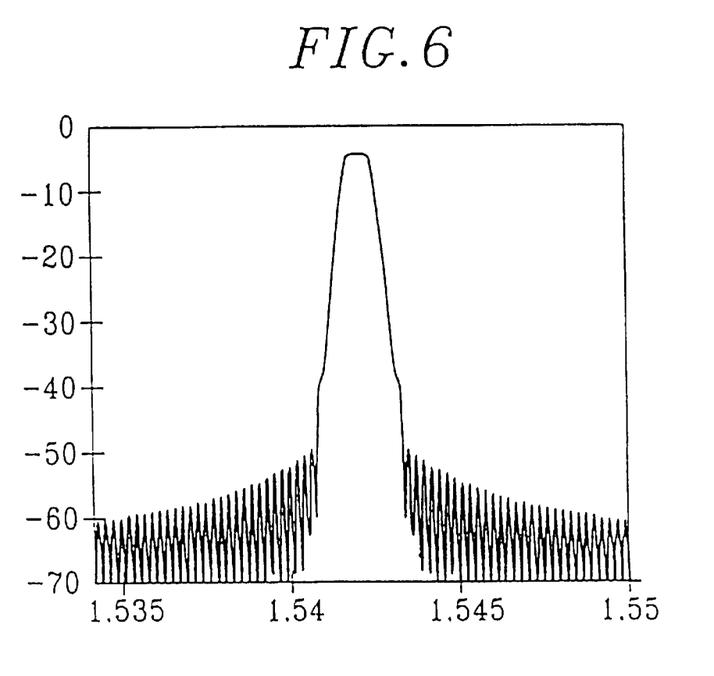

Similarly, FIG. 6 shows the square spectral response of a 70 waveguide phasar having a factor of merit of 37.5%, obtained with A equal to 2 µm and $\phi$ equal to −0.05 radians.

Figure 7:
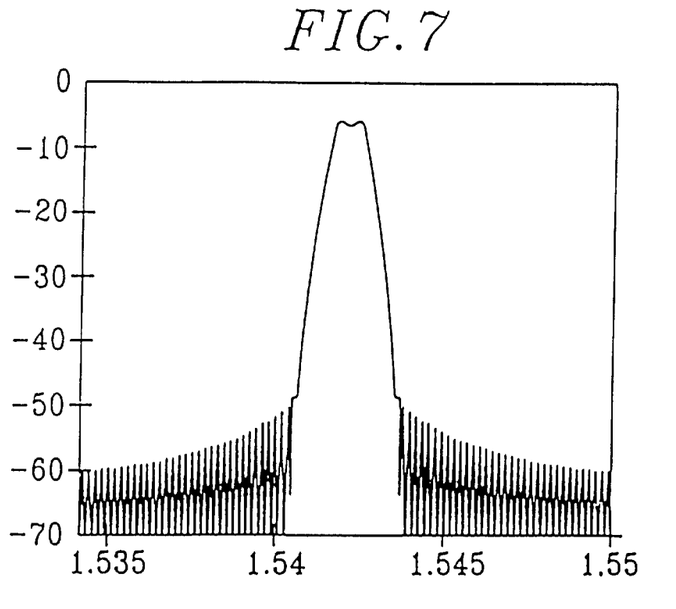
Figure 8:
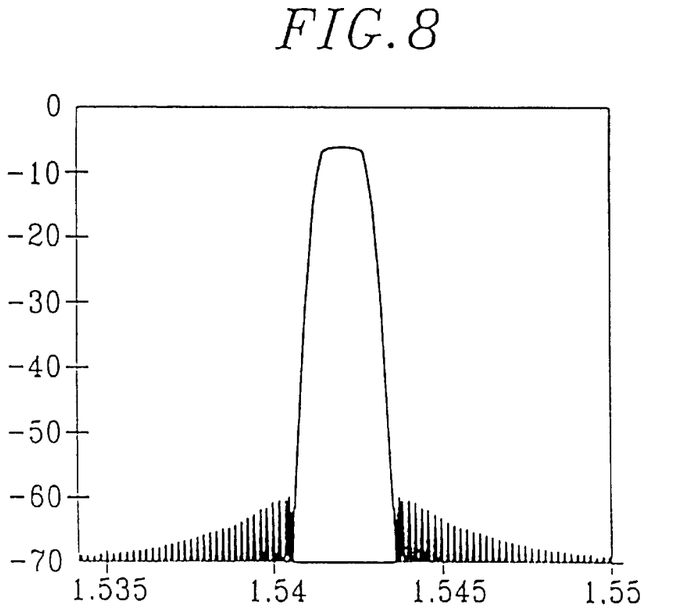

FIG. 7 shows a square spectral response having a factor of merit equal to 46.5%, for an 82 waveguide phasar obtained using A equal to 3.2 µm and $\phi$ equal to 0.2 radians.

FIG. 6 shows a square spectral response having a factor of merit equal to 54%, for a 102 waveguide phasar obtained using A equal to 5 µm and $\phi$ equal to −0.4 radians.

For each of the phasars corresponding to FIGS. 5 to 8, the power distribution in the array is Gaussian and can be written $K.\exp(-x/0.55)^2$ where x lies in the range −1 to +1 while the waveguide number lies in the range 1 to N. The amplitude K is set by the number of waveguides N in the array.

More generally, to determine directly a set $\Delta L_1, \Delta L_2, \ldots, \Delta L_N$ or $\varepsilon_1, \varepsilon_2, \ldots, \varepsilon_N$ of additional optical path lengths, it is possible to adopt a distribution function f of these optical path length differences defined by $f(x)=A.\cos((\pi+\phi).x)$, where x lies in the range −1 to +1 while the waveguide number lies in the range 1 to N, and the values selected for A and $\phi$ are optimized so as to obtain a spectral response h(u) given by:

$$h(u) = \sum_{n=1}^{N} P_n \cdot e^{j\varepsilon_n} \cdot e^{j(n-1)u}$$

having the desired square shape.

The inventors have discovered that the greater the value of A, the wider the spectral response. Similarly, the greater the value of $\phi$ when positive, the greater the number of oscillations in the passband of the spectral response. Finally, the greater the number of waveguides, the narrower the spectral response.

In general but non-limiting manner, spectral responses of sufficiently square shape are obtained when selecting values for A in the following ranges:

if N lies in the range 10 to 55, A should lie in the range 1 µm to 1.8 µm;

if N lies in the range 50 to 75, A should lie in the range 1.6 µm to 2.1 µm;

if N lies in the range 65 to 85, A should lie in the range 1.9 µm to 3.3 µm; and if N lies in the range 80 to 105, A should lie in the range 3.1 µm to 5.1 µm.

It is thus generally advantageous to select A lying in the range 1 µm to 6 µm, and similarly $\phi$ is advantageously selected to lie in the range 0.5 radians to −0.5 radians. Naturally, the invention covers other values of A and $\phi$.

Once A and $\phi$ have been selected, the cosine function of the function f can be approximated for $(\pi+\phi)x$ lying in the range $-\pi/2$ to $+\pi/2$ by means of a Gaussian or of a polynomial of order 2 or greater. The spectral response then remains square.

More generally, the invention is not limited to differences $\Delta L_i$ distributed on the plot of a function f of the form $f(x)=A.\cos((\pi+\phi).x)$.

Calculating the additional lengths $\Delta L_I, \Delta L_2, \ldots, \Delta L_N$ using the iterative process described above can also result in a distribution function for the additional lengths that is not sinusoidal.

Figure 9:
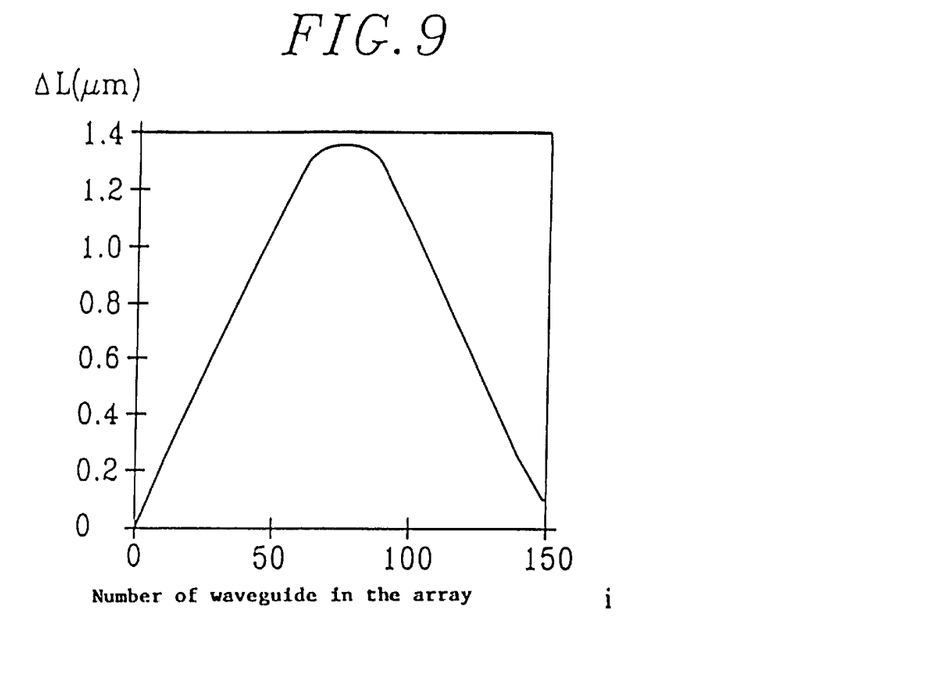
FIG. 9 is a plot showing a distribution of optical path length differences for an array of 150 waveguides of the present invention.

Thus, FIG. 9 shows a distribution of differences $\Delta L_i$ obtained for a phasar having 150 waveguides in its array and including eight channels.

Figure 10:
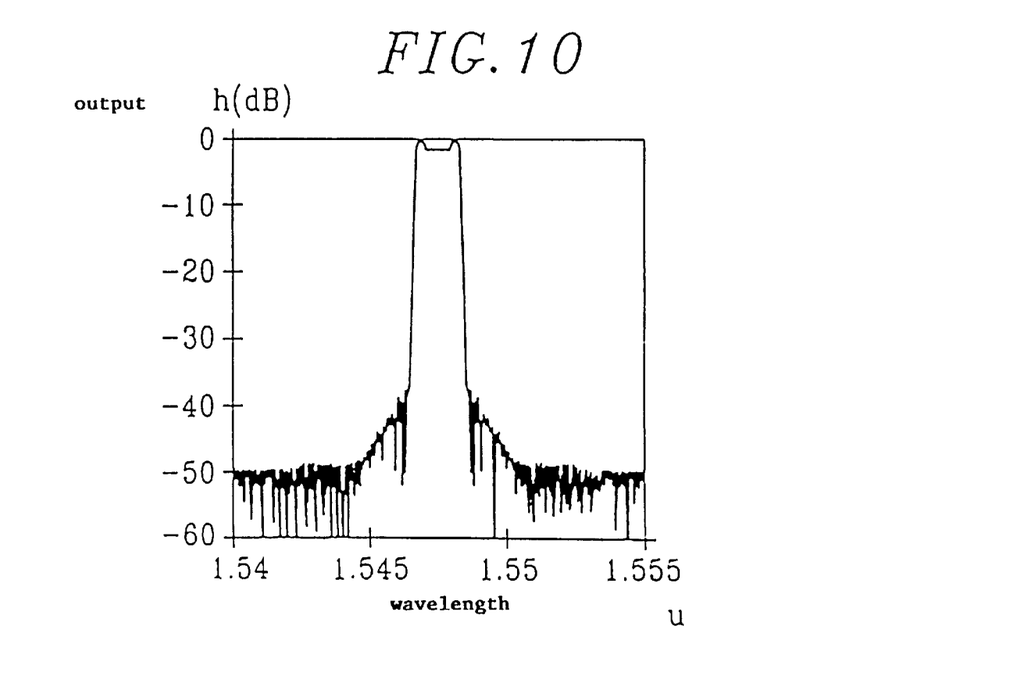
FIG. 10 is a plot of a spectral response corresponding to the distribution of FIG. 9.

With a 150 waveguide phasar having this distribution, the spectral response of FIG. 10 was obtained, which has a factor of merit η greater than 90%.

As shown in FIG. 9, the changes to the lengths of the waveguides are about 1.5 μm. This order of magnitude makes it possible in practice to control the lengths of the waveguides accurately. The distribution of additional lengths in FIG. 9 does not have a horizontal tangent in the vicinity of the lowest waveguide numbers, nor in the vicinity of waveguide numbers close to N, where N is equal to 150 in this case.

This distribution function for the additional lengths $\Delta L_i$ has the following shape. It increases with substantially constant slope to a waveguide number close to 4.N/10, i.e. about waveguide number 65, and then describes a rounded line passing in symmetrical manner through a vertical axis passing through N/2, i.e. through 75, with the slope of the rounded line decreasing until its value is opposite to that of the substantially constant slope followed between numbers 1 to 65.

Thereafter, the distribution function of FIG. 9 decreases from 85 to 150 with a substantially constant slope opposite to that extending between 1 and 65.

Two methods are proposed above for calculating the differences $\Delta L_i$. Naturally, any other method of calculation could be used without going beyond the ambit of the invention.

Similarly, the invention is not limited to Gaussian type power distribution in the array. Any other type of power distribution can be adopted.

In known manner, a flat spectral response makes certain small offsets between the TE and TM peaks acceptable, e.g. a possible offset associated with poor control over geometry can be accommodated.

Nevertheless, to obtain better independence from polarization, the array of waveguides is advantageously made to be intrinsically independent of polarization.

For this purpose, any known technique can be used, such as using waveguides that are not birefringent, using a half-wave plate, using an integrated polarization converter, compensating birefringence in the array, or any other technique.

Figure 11:
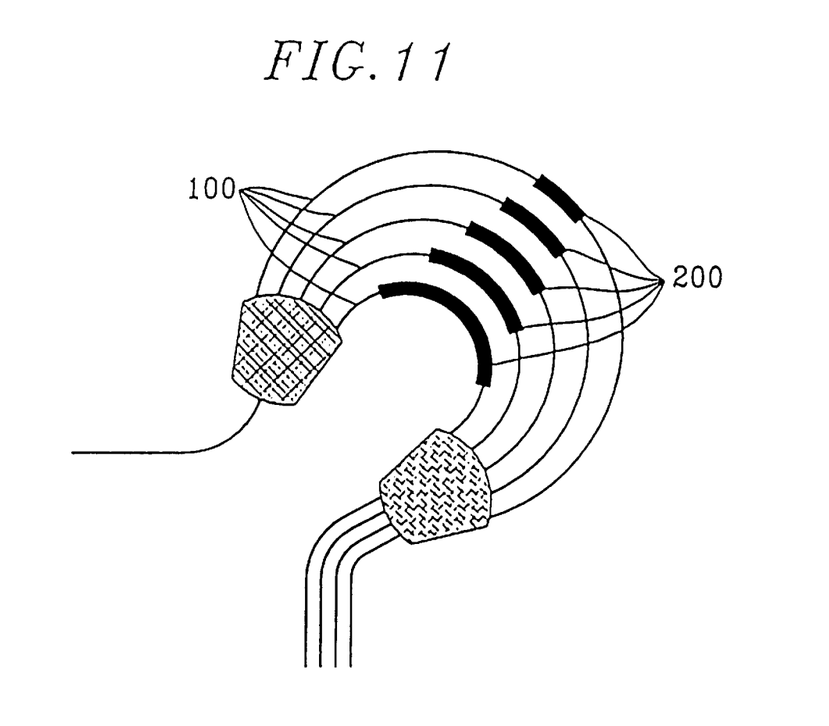
FIG. 11 shows an optical component of the present invention in which each of the waveguides of the array is constituted by two portions of different birefringence.

As shown in FIG. 11, it is possible to provide an array in which each of the waveguides has two portions 100 and 200 of different, non-zero birefringence.

Such dispositions are described, in particular, in French patent application No. FR-95/04031 filed on Apr. 5, 1995, and in the article "Taper-assisted polarization compensation in efficiency fiber-coupled InP demultiplexer", Electronics Letters, September 26, 1996, Vol. 32, No. 20, pp. 1885–1886, by A. Rigny, C. Ramus, A. Bruno, Y. Raffle, H. Sik, G. Post, M. Carre, and A. Carenco.

Figure 12:
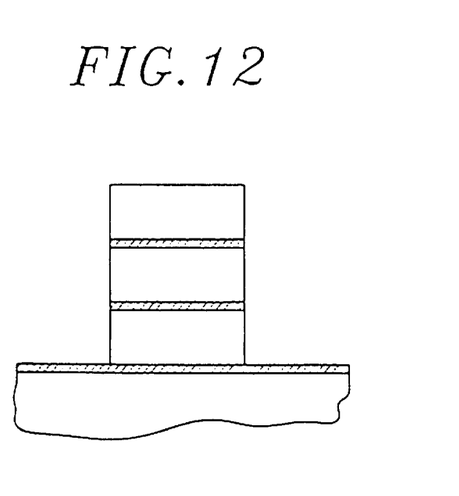
FIG. 12 is a cross-section through a waveguide of the FIG. 11 array in a normal type portion thereof.

Thus, the array uses waveguides having portions of two different types. A first type of portion, referenced 100 in FIG. 11, and referred to as the "normal" type or type "I" is shown in cross-section in FIG. 12.

Figure 13:
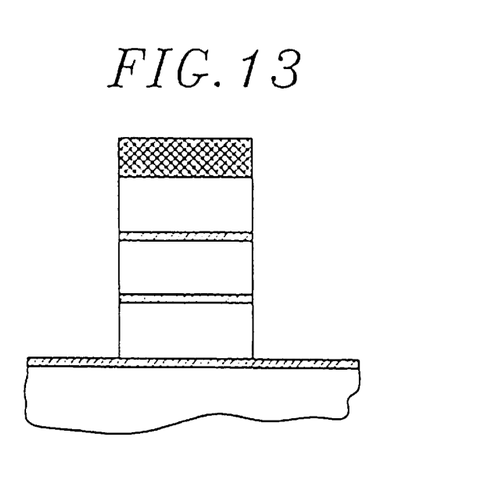
FIG. 13 is a cross-section through a waveguide of the FIG. 12 array, in a compensation type portion thereof.

A second type of waveguide portion, referred to as "compensation" type or type "II", referenced 200 in FIG. 11 is shown in cross-section in FIG. 13.

Table A below gives the thickness and the wavelength of the forbidden band for each of the layers making up an I type waveguide portion, with the top-to-bottom order in the table corresponding to the top-to-bottom disposition of the layers in the waveguide.

TABLE A

| Material | Thickness (μm) | Wavelength of forbidden band (μm) |
|---|---|---|
| InP | 0.55 | — |
| Quaternary | 0.05 | 1.3 |
| InP | 0.55 | — |
| Quaternary | 0.05 | 1.3 |
| InP | 0.55 | — |
| Quaternary | 0.05 | 1.3 |
| InP (substrate) | Substrate | Substrate |

Table B below gives the thickness and the wavelength of the forbidden band for each of the layers making up an II type waveguide portion, with the top-to-bottom order in the table corresponding to the top-to-bottom disposition of the layers in the waveguide.

TABLE B

| Material | Thickness (μm) | Wavelength of forbidden band (μm) |
|---|---|---|
| Quaternary | 0.38 | 1.2 |
| InP | 0.55 | — |
| Quaternary | 0.05 | 1.3 |
| InP | 0.55 | — |
| Quaternary | 0.05 | 1.3 |
| InP | 0.55 | — |
| Quaternary | 0.05 | 1.3 |
| InP (substrate) | — | — |

These structures are made by epitaxial growth on a plane substrate in a single step. The type I and II waveguides are made by dry reactive ion etching (RIE), as strips of width equal to 5 μm.

The resulting type I and II waveguides are monomode and close to mode cutoff. Their refractive index thus varies little relative to the thicknesses and compositions of the layers. Thus, a tolerance of 100 Ångströms on thicknesses and of 30 nm on compositions is perfectly acceptable.

The two types of waveguide described above thus make it possible to provide compensation to achieve independence from polarization.

Reference can be made to the above-mentioned article to determine the wavelengths to be adopted for the portions of type I and II. This compensation is implemented without taking account of the additional lengths $\Delta L_i$ of the waveguides, i.e. the dimensions of the type I and type II portions are calculated on the basis of the value of the fixed increment $\Delta L_0$ for the initial array, i.e. from the mean linear distribution of optical path lengths of the waveguides.

It is merely pointed out that for $\Delta_{type\ I}$ being the difference in length between two adjacent waveguides assuming the entire array is of type I, then a length difference $\Delta_{type\ II}$ is sought between two portions of type II belonging to two adjacent waveguides in such a manner as to obtain zero overall birefringence for the waveguides of the array.

What is claimed is:

1. A multiplexer and/or demultiplexer optical component of the waveguide array spectrograph type having an inlet coupler and an outlet coupler between which said array extends, and including inlet and outlet optical waveguides respectively for said inlet and outlet couplers, wherein the waveguides being numbered in order of increasing optical path length, the optical path lengths of the waveguides describe a function of the waveguide number which varies about a mean linear function, a difference measured between said waveguide number function and said mean linear function describing a difference function not limited to a set of two linear functions, said difference function being suitable for giving the optical component a spectral response that is square in shape.

2. An optical component according to claim 1, wherein, said array comprising a number N of optical waveguides, the difference function is a function $\epsilon(i)$ where i is the waveguide number in the range 1 to N, the function being of the following form:

$$\varepsilon(i) = A\cos\left[(\pi + \phi)\frac{-(N+1)+2i}{(N-1)}\right]$$

in which A and $\phi$ are two constants.

3. An optical component according to claim 2, wherein $\phi$ lies in the range −0.5 radians to +0.5 radians.

4. An optical component according to claim 2, wherein A lies in the range 1 $\mu$m to 6 $\mu$m.

5. An optical component according to claim 1, wherein the difference function is zero for the first and the last waveguide numbers in the array.

6. An optical component according to claim 1, wherein the difference function reaches a maximum for a waveguide number close to half the total number of waveguides in the array.

7. An optical component according to claim 1, wherein the difference function presents a horizontal tangent in the vicinity of the lowest waveguide numbers and in the vicinity of the highest waveguide numbers.

8. An optical component according to claim 1, wherein the difference function is determined as follows:

a) a fixed increment type of distribution is initially selected for the waveguide lengths, giving a known spectral response $F_1$;

b) a lower rectangular function $M_I$ and an upper rectangular function $M_S$ are selected between which the square-shaped spectral response of the optical component is to be found;

c) a function $F_2$ lying between $M_I$ and $M_S$ and having values close to those of $F_1$ is deduced from $F_1$;

d) for the function $F_2$ written as follows after applying the Fourier transform:

$$F_2(u) = \sum_{N=\infty}^{+\infty} a_n \cdot e^{j(n-1)u}$$

and for $P_1, P_2, \ldots, P_N$ being the powers conveyed respectively by the waveguides of numbers 1, 2, ..., N, a new function $F_1$ is defined as follows:

$$F_1(u) = \sum_{n=1}^{N} \frac{a_n}{|a_n|} \cdot P_n \cdot e^{j(n-1)u}$$

e) the sequence of steps c) and d) is repeated until the function $F_1$ obtained in step d) lies substantially between the lower and upper rectangular functions $M_I$ and $M_S$; and then f) a phasar is made in which each waveguide of number i in the number 1 to N has an optical path length equal to the sum of the length of waveguide number i in the initial distribution plus a difference equal to the phase of $a_i$.

9. An optical component according to the claim 8, wherein $F_2$ is determined from $F_1$ as follows:

for a given wavelength u:

if $F_1(u)$ is less than $M_I(u)$, then $F_2(u)=M_I(u)$;

if $F_1(u)$ lies between $M_I(u)$ and $M_S(u)$, then $F_2(u)=F_1(u)$; and if $F_1(u)$ is greater than $M_S(u)$, then $F_2(u)=M_S(u)$.

10. An optical component according to claim 1, wherein each of the waveguides of the array is made up of two waveguide portions of different birefringence.

* * * * *